United States Patent
Tsunedomi et al.

(10) Patent No.: US 7,484,214 B2
(45) Date of Patent: Jan. 27, 2009

(54) REAL TIME CONTROL SYSTEM

(75) Inventors: Kunihiko Tsunedomi, Tokyo (JP); Shinya Imura, Tokyo (JP); Takanori Yokoyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/566,359

(22) PCT Filed: Aug. 4, 2003

(86) PCT No.: PCT/JP03/09877

§ 371 (c)(1),
(2), (4) Date: Jan. 30, 2006

(87) PCT Pub. No.: WO2005/013130

PCT Pub. Date: Feb. 10, 2005

(65) Prior Publication Data

US 2006/0242650 A1 Oct. 26, 2006

(51) Int. Cl.
*G06F 9/46* (2006.01)
*G06F 3/00* (2006.01)
*G06F 9/44* (2006.01)
*G06F 13/00* (2006.01)

(52) U.S. Cl. .................. 718/101; 718/102; 719/318; 710/58; 710/266

(58) Field of Classification Search .......... 710/7, 710/58, 261, 263, 264, 266, 269; 718/100, 718/102–104, 106–108, 101; 719/314, 318, 719/329; 700/17, 79, 83
See application file for complete search history.

(56) References Cited

U.S. PATENT DOCUMENTS 3,913,070 A * 10/1975 Malcolm et al. ............ 718/104
5,081,577 A * 1/1992 Hatle ............................. 710/7
5,153,837 A * 10/1992 Shaffer et al. ............... 705/412
5,201,053 A * 4/1993 Benhase et al. ............. 710/109
5,295,265 A   3/1994 Ducateau et al.

(Continued)

FOREIGN PATENT DOCUMENTS

JP    60-176145    9/1985

(Continued)

OTHER PUBLICATIONS

International Search Report.

(Continued)

*Primary Examiner*—Crystal J Barnes Bullock
(74) *Attorney, Agent, or Firm*—Crowell & Moring LLP

(57) ABSTRACT

A real-time control system for executing exactly a cyclic task, preventing a delay of the processing start time due to accumulation of a plurality of overhead times, thereby executing control enabling a more detailed response and control enabling a quick and reliable response to a plurality of instructions is provided.

The real-time control system includes a driver unit for receiving an input signal and outputting an interruption signal corresponding to each task process, a polling unit for polling on the basis of the concerned interruption signal, and a task processor for performing a task process on the basis of the interruption signal, wherein the polling unit outputs a task processing signal on the basis of the polling when the task is finished and the task processor performs the task process on the basis of the task processing signal.

12 Claims, 9 Drawing Sheets

U.S. PATENT DOCUMENTS

| | | | |
|---|---|---|---|
| 5,404,536 A | | 4/1995 | Ramakrishnan et al. |
| 5,440,746 A | * | 8/1995 | Lentz .................... 345/504 |
| 5,471,618 A | * | 11/1995 | Isfeld ..................... 710/19 |
| 5,619,409 A | * | 4/1997 | Schultz et al. ............. 700/17 |
| 6,145,015 A | | 11/2000 | Iwasaki et al. |
| 6,154,832 A | * | 11/2000 | Maupin .................. 712/228 |
| 6,260,058 B1 | * | 7/2001 | Hoenninger et al. ....... 718/107 |
| 6,366,686 B1 | | 4/2002 | Schroeder et al. |
| 6,425,038 B1 | * | 7/2002 | Sprecher ................. 710/269 |
| 6,434,708 B1 | | 8/2002 | Dunnihoo et al. |
| 6,633,942 B1 | * | 10/2003 | Balasubramanian ....... 710/264 |
| 7,058,949 B1 | * | 6/2006 | Willen et al. ............. 718/104 |
| 7,114,163 B2 | * | 9/2006 | Hardin et al. ............. 719/318 |
| 7,313,797 B2 | * | 12/2007 | Sundaram et al. .......... 718/108 |
| 2003/0014474 A1 | * | 1/2003 | McKaig et al. ............ 709/108 |
| 2004/0049628 A1 | * | 3/2004 | Lin et al. ................. 711/103 |
| 2004/0088704 A1 | * | 5/2004 | Owen et al. .............. 718/100 |
| 2007/0294702 A1 | * | 12/2007 | Melvin et al. ............. 718/104 |

FOREIGN PATENT DOCUMENTS

| | | |
|---|---|---|
| JP | 62-209626 | 9/1987 |
| JP | 09-026887 | 1/1997 |
| JP | 2000-250764 | 9/2000 |
| JP | 2002-189606 | 7/2002 |
| JP | 2003-015885 | 1/2003 |
| JP | 2003-15885 | 1/2003 |
| JP | 2003-036176 | 2/2003 |

OTHER PUBLICATIONS

OSEK/VDK, Operating System Specification, Version 2.2.1, Jan. 16, 2003, pp. 1-84.

T. Yokoyama et al., "Kumikomi Seigyo System no tame no Jikan Kudo Object Shiko Software Kaihatsuho," *The Transactions of the Institute of Electros*, 2001, vol. J84-D-1, No. 4, pp. 338 to 349.

Operating System Concepts, Fourth Edition, pp. 30-32 (Abraham Silberschatz, Addison-Wesley Publishing Company).

European Search Report dated Feb. 22, 2008 (Three (3) pages).

Japanese Office Action dated Jul. 1, 2008 with English Translation.

* cited by examiner

FIG. 3

| TASK ID | EVENT |
|---------|---------|
| 0 | INPUT A |
| 1 | INPUT B |

FIG. 4

| TASK ID | CYCLE |
|---------|-------|
| 0 | 10 |
| 1 | 0 |

REAL TIME CONTROL SYSTEM

FIELD OF THE INVENTION

The present invention relates to a real-time control system and more particularly to a real-time control system for detecting cyclic events and events of a plurality of signals, thereby performing a task process.

BACKGROUND OF THE INVENTION

In a controller of a car and a controller of other industrial devices, real-time performance of improving the response of receiving a signal from an object for control to start of a process and surely executing and finishing a necessary process within a restricted time is required. Particularly, in an operating system (hereinafter referred to as OS) required to execute a predetermined process in real time on the assumption of insurance of the control response and safety of a car, it is necessary to support a cyclic task for cyclically starting a task and an event task for starting a task when an event occurs.

For example, a standard OS loaded in a car such as shown in OSEK/VDX Operating System Specification 2.2.1 which is not a patent document provides a function referred to as a time table service for cyclically starting a plurality of tasks. When a system call for starting the time table service is executed, the registered tasks are started every designated cycle and by this start, the cyclic task is realized.

Such a real-time control system having an OS is used as a controller for controlling an engine of a car and the system is often constructed so as to operate the controller by time drive using the cyclic task. The reason is that in this method, by adjustment of the task execution interval, the calculation load can be adjusted easily and the task can be described simply. In this method, the cyclic task decides firstly whether an event occurs or not by polling an input module and when it does, continuously performs the event task.

However, under special engine control, it may be desired to start the task in a cycle lower than the one defined by the OS. In this case, the cyclic task function cannot be used. Instead, a timer polling function is provided in the task and until the next cyclic time, polling is executed.

Further, in Operating System Concepts, Fourth Edition, pp. 30 to 32 (Abraham Silberschatz, Addison-Wesley Publishing company) which is not a patent document, a real-time control system as indicated below is disclosed. The real-time control system, to improve the control response, changes input from an object for control to an interruption signal, notifies it to an arithmetic unit, causes an interruption, interrupts the process during execution, and starts and executes the task for processing the object for control from an interruption handler. Further, to guarantee the real-time performance of the task during execution of the interruption process, during interruption of the task, the system inhibits interruptions.

Furthermore, in the specification of Japanese Patent Laid-Open No. 2002-189606, a cyclic control method of constituting so as to temporarily stop and then restart a cyclic program, thereby eliminating an overhead time at restart time is disclosed. In addition to it, in the specification of Japanese Patent Laid-Open No. 2000-250764, a process execution apparatus for subdividing a plurality of tasks for each function, forming independent tasks, thereby decreasing an overhead time for application switching is disclosed.

In engine control for executing the same task repeatedly and cyclically like this, the start cycle of the cyclic task is about 1 ms at minimum and when executing a plurality of tasks using a timer, the input interval is about 1 ms. And, these processing times are comparatively longer than the processing speed of the CPU (operation at 50 to 60 MHz), so that the calculation load is not so high. However, in recent years, due to a request for environmental correspondence, finer control has been required. For example, a car engine using an electric drive valve is required to be controlled in a shorter cycle than the conventional one by one digit or more. Further, even when executing a plurality of tasks, the concerned car engine is required to be controlled at finer timing (several tens µsec).

To satisfy these conditions, in a process of cyclically executing the task, it is necessary to shorten the process cycle. In the conventional method, the overhead time required for the interruption process at the start of the cycle cannot be changed, so that a process for shortening the event processing time is performed. However, this process increases the timer interruption count, so that the calculation load is increased. Further, no task can be executed in a shorter cycle than the overhead time. Furthermore, in this cyclic task method, the overhead time generated in each cycle is accumulated, so that there is a possibility that detection of an event may be delayed one cycle at most. Further, the conventional timer polling method cannot operate the tasks other than the task in operation, so that processes other than the calibration control cannot be performed.

Furthermore, when executing a plurality of interruption processes, interruptions by duplicated processes are inhibited, so that the aforementioned processes are generated independently, thus each interruption requires an overhead time of several tens to several hundreds µsec. The overhead time is very long, so that the request aforementioned cannot be satisfied. Further, a plurality of interruptions are processed sequentially, so that the overhead time of each interruption is accumulated, and the processing time as a whole is increased, and for the tasks executed later, the start is delayed, and furthermore, when there are many interruptions, it may be considered that for all the interruptions, the requirement cannot be satisfied.

When a plurality of interruptions are generated continuously or simultaneously like this, a technology relating to a constitution of reducing the overhead time generated for each interruption has not been disclosed.

The present invention was developed with the foregoing problem in view and is intended to provide a real-time control system, when a cyclic event occurs or a plurality of events occur simultaneously, for exactly executing a cyclic task, preventing a delay of the processing start time due to accumulation of a plurality of overhead times, thereby executing control enabling more detailed responses and control enabling quick and reliable responses for a plurality of instructions.

SUMMARY OF THE INVENTION

To accomplish the above object, the real-time control system relating to the present invention includes a driver unit for receiving an input signal and outputting an interruption signal corresponding to each task process, a polling unit for polling on the basis of the concerned interruption signal, and a task processor for performing a task process on the basis of the interruption signal, wherein the polling unit outputs a task processing signal on the basis of the polling when the task is finished and the task processor performs the task process on the basis of the task processing signal.

The real-time control system of the present invention which is configured as mentioned above performs an interruption process by the driver unit and performs the task process on the basis of the interruption signal and for the subsequent interruption signals, does not perform the interruption process by the driver unit, and performs the task process on the basis of the task processing signal from the polling unit. Namely, when performing an event process, the system receives repeatedly the interruption signal from the driver unit and may not start the task and when the task process is continued, the overhead time is generated one time at the first time.

In the real-time control system relating to the present invention, the task processor is composed of an event processing means for executing the event process and a task deciding means for deciding the continuity of the event process, and the event processing means, when the decision result is "continuation", executes the event process continuously.

The real-time control system of the present invention which is configured as mentioned above, even if it has the event processing means corresponding to an input signal, since a plurality of input signals inputted continuously or simultaneously during the task process perform the task decision process, regards them as a series of processes, so that the overhead time is generated only one time at start of the task process. Further, when signals are input at wide intervals, although the overhead time and the processing time of the polling unit are generated, the processing time of the polling unit is not so long, so that the time as a whole is not affected.

In the real-time control system relating to the present invention, the event processing means performs the event process of starting the cycle and according to the decision of continuation or end of the event process which is decided by the task deciding means, decides execution of the process.

The real-time control system of the present invention which is configured as mentioned above, when starting the cycle, decides continuation or end of the event process in the task, and decides the operation of the event process of the event processing means, so that the overhead time generated every cycle is only generated one time when the cycle is started.

In the real-time control system relating to the present invention, the polling unit polls the present time from the timer and on the basis of the polling result, outputs the task processing signal corresponding to the start time of the event processing means.

In the real-time control system of the present invention which is configured as mentioned above, in the task process of starting the cycle, the task processing signal may be a signal corresponding to the start time of the task process, and the signal for deciding the start time does not call an external timer of the system of the present invention and does not decide the start time via the driver unit, so that the start time can be transmitted faster to the processing means in the task.

In the real-time control system relating to the present invention, the task deciding means, on the basis of the continuation count of the task process or existence of the interruption signal during the task process, decides the continuity of the task process.

The real-time control system of the present invention which is configured as mentioned above can decide the continuity of the event process in correspondence to an interruption of the signal and the contents of the event process.

The real-time control system relating to the present invention has a scheduler for communicating with the driver unit, task processor, and polling unit, starting in correspondence to reception of the interruption signal, and storing the decision result.

The real-time control system of the present invention which is configured as mentioned above, when the driver unit, task processor, and polling unit communicate with each other, can store temporarily data in the scheduler and can transfer data from the scheduler at efficient timing.

In the real-time control system relating to the present invention, the scheduler has a cyclic table for recording the cycle corresponding to the event processing means and the task deciding means, when the event process is completed, decides the continuity of the event process from the cyclic table.

The real-time control system of the present invention which is configured as mentioned above, since the cyclic table corresponding to the process is installed in the scheduler, from the time polled from the timer which is indicated before and the cycle of the cyclic table, calculates the start time of the corresponding task process by the polling unit, and can transmit the data to the task processor. Further, from the cyclic table, the system can decide whether the event processing means has periodicity or not and from the decision result, can decide whether or not to continue the event process. Furthermore, although the cyclic table is installed in the scheduler, it is possible to install the cyclic table outside the scheduler and receive the cycle of the cyclic table by the scheduler.

The real-time control system relating to the present invention, until the scheduler stores the decision result of end when the task deciding means is in operation, inhibits the interruption signal to interrupt the task.

The real-time control system of the present invention which is configured as mentioned above inhibits the interruption of the interruption signal during the event process, so that the system is not affected by an interruption during the task process and can surely execute the process.

In the real-time control system relating to the present invention, the polling unit polls the interruption signal generated during the event process and outputs the task processing signal for executing the event process corresponding to the concerned interruption signal.

The real-time control system of the present invention which is configured as mentioned above, even if a request for the next event process is generated during the event process, continues polling, so that there is no need to inhibit such an interruption and transmit again an input signal to the driver unit. Therefore, at time of an individual interruption, no overhead time is generated.

In the real-time control system relating to the present invention, the task deciding means, on the basis of existence of the task processing signal, decides the continuity of the event process.

In the real-time control system of the present invention which is configured as mentioned above, the interruption is a task processing signal and when there is no interruption caused, the event process can finish.

Further, in the real-time control system relating to the present invention, when the plurality of task processing signals are detected at the same time, the task deciding means reads the task processing signals in order of pre assigned priority to each of them. Further, in the real-time control system relating to the present invention, when the plurality of task processing signals are detected at the same time, the task deciding means, at the detection time, reads in priority signals different from the task processing signals corresponding to the event process performed by the event processing means.

In the real-time control system of the present invention which is configured as mentioned above, the event processing means corresponding to the respective input signals are executed, and when a plurality of input signals are inputted, priority for the each event processing mean may be set in processing order, or conditions for avoiding to continuously process the same signal may be set, and when such conditions are set, the event process corresponding to an interruption request can be satisfied exactly.

BRIEF DESCRIPTION OF THE DRAWINGS

FIG. 3 is an event table showing the correspondence between the task ID and the event based on the interruption factor.

FIG. 4 is a table showing the cycle of each event.

DESCRIPTION OF THE PREFERRED EMBODIMENTS

Hereinafter, the embodiments of the real-time control system relating to the present invention will be explained in detail with reference to the accompanying drawings.

Figure 1:
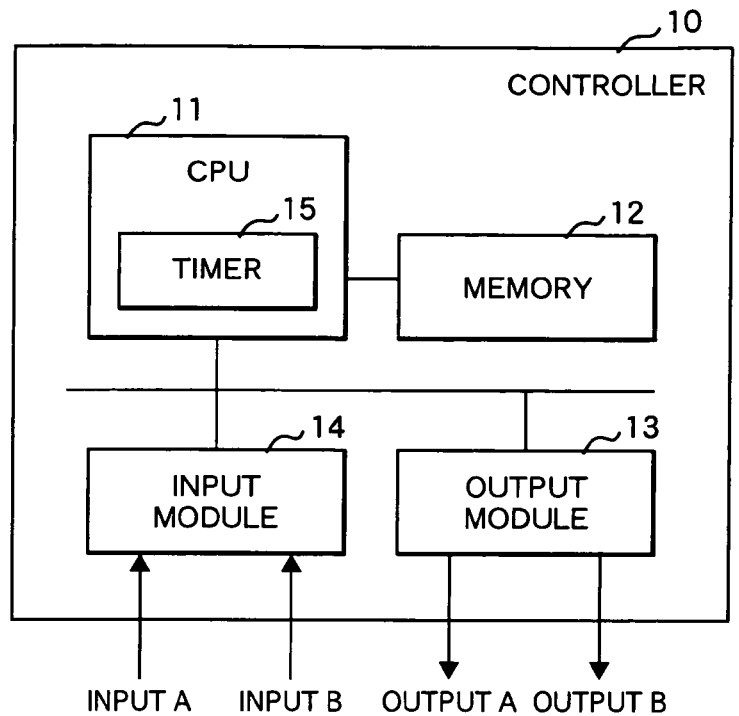
FIG. 1 is a block diagram showing the constitution of the hardware of the controller relating to the embodiments of the present invention.

FIG. 1 is a control block diagram showing the constitution of the hardware of a real-time control system (controller) 10 relating to an embodiment of the present invention. As shown in FIG. 1, the controller 10 is composed of a CPU 11 (arithmetic unit), a memory 12, an output module 13, and an input module 14 and these hardware is joined by a bus.

The input module 14 is hardware for processing inputs A and B which are input signals. The hardware reflects input signals on a register and when necessary, interrupts the CPU 11. And, the input module 14 can input one or more input signals and whenever a signal is input, can interrupt the CPU 11. Concretely, the input module 14 has a flag for discriminating a port receiving an input signal and can give the flag to the CPU 11 as an interruption factor.

Further, the CPU 11 has an arithmetic unit, receives a signal from the input module 14 as an interruption factor, and upon receipt of the interruption factor, reads and executes a signal from the memory 12 as an instruction. In addition to it, the CPU 11 has a timer 15 and a built-in memory. When using a CPU having no built-in timer 15, an external timer may be used. The timer 15 is a counter for indicating the elapsed time to the CPU 11. In this embodiment, the timer 15 is an up-counter, though even if the timer 15 is a down-counter, it may be available.

Further, the memory 12 has a nonvolatile memory and/or a volatile memory and upon receipt of an input signal from the CPU 11, transmits a signal, which is an instruction for the calculation executed by CPU 11, to the CPU 11. As a nonvolatile memory, there are an EEPROM and a flash memory available and the nonvolatile memory records a program and an initial value of data. On the other hand, as a volatile memory, there are an SRAMS and an SDRAM available and the volatile memory records data and/or a stack. An operating system (hereinafter referred to as OS) for executing the real-time control unit of the embodiment is also recorded in the memory 12.

Furthermore, the output module 13 is hardware for processing an output signal on the basis of calculation results from the CPU 11. The output module 13 can have one or more output ports. In this connection, in this embodiment, the output module 13 may not be installed.

Figure 2:
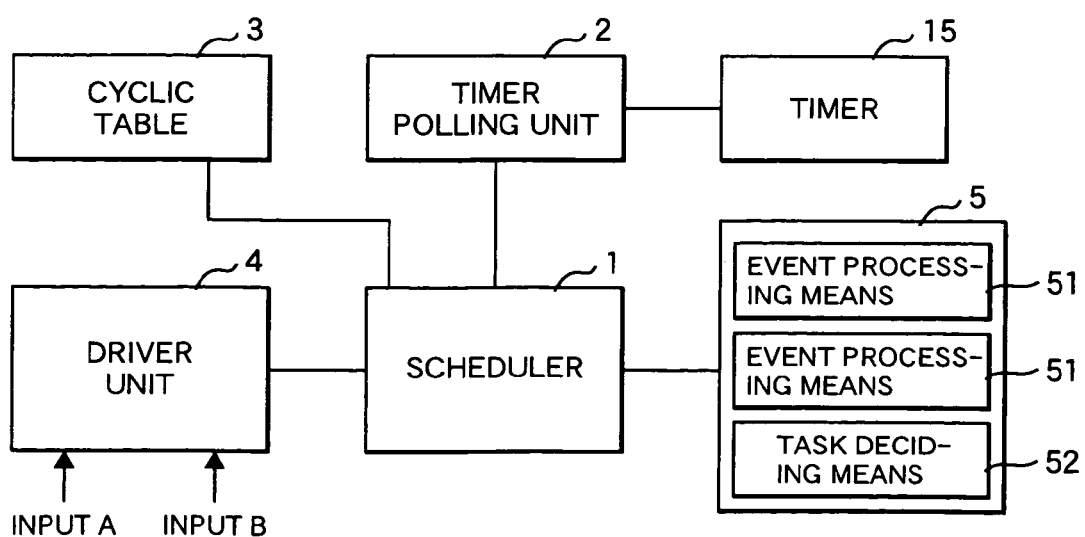
FIG. 2 is a block diagram showing the first embodiment of the real-time control system relating to the present invention.

FIG. 2 is a control block diagram showing the software of the real-time control system of the first embodiment. The software of this embodiment is composed of a scheduler 1, a timer polling unit 2, a cyclic table 3, a driver unit 4, a task processor (hereinafter referred to as a task) 5, and the timer 15 of the CPU 11.

The scheduler 1, the timer polling unit 2, the driver unit 4, and the task 5 are included in the OS, though they may exist outside the OS as middleware. Further, with respect to the task 5, according to the application request, two or more tasks may exist.

Firstly, the driver unit 4 is composed of an interruption handler installed in the driver unit 4 and a device driver for initializing and/or reading and writing the register of the input module 14. Namely, the driver unit 4, immediately after resetting, initializes the registers of the input module 14 and the output module 13. Further, when a reception interruption of an input signal which is an interruption factor of the input module 14 which is indicated before is required, the driver unit 4 is set so as to permit an interruption of an input signal composed of input A or input B from the input module 14. And, the interruption handler of the driver unit 4, immediately after an occurrence of an interruption, reads an input signal from the input module 14 and transmits an interruption signal to the scheduler 1.

Further, the scheduler 1, when the interruption handler of the driver unit 4 receives the interruption signal of the input A or B which is read from the input module 14, is started.

FIG. 3 is an event table showing the correspondence between the task ID for discriminating a plurality of event processing means 51 existing in the task 5 which will be described later and the event based on the interruption factor of the input A or B inputted by the driver unit 4 and the scheduler 1 has the event table. And, the scheduler 1, according to the event of the input A or B, retrieves the task ID from the event table and transmits the retrieved task ID to the task 5. In this connection, the scheduler 1 discriminates the interruption of the input A as task ID=0 and the interruption of the input B as task ID=1, transmits the task ID to the task 5, and starts the task 5. Further, the scheduler 1 retains data of two tasks, though it can retain data of 3 or more tasks. Furthermore, the scheduler 1, after transmission of the task ID, receives a return value which is a signal from the task 5 and will be described later, reads the cyclic time of the task from the cyclic table 3, gives an argument to the timer polling unit 2, and as a result, transmits a task processing signal, which is the next processing start time of the task 5, to the task 5.

Further, the task 5 is a program for executing an application process, which has an event processing means 51 for performing a plurality of event processes corresponding to the task ID and a task deciding means 52 for deciding continuation or end of the event processes. And, to execute the event processing means 51 having an event processing function of the task 5, the task ID retrieved from the event table of the scheduler 1 jumps to an entry address, thereby starts the task 5, and returns the decision result of the task deciding means, which is indicated before, to the scheduler 1.

In addition to it, the event processing means 51 of the task 5 relating to the embodiment may have an event task and an event starting cyclic task and the scheduler 1 supports the two kinds of event processing means 51. In other embodiments, the scheduler 1 may support the cyclic task. When supporting the cyclic task, an interruption of the timer of the cyclic task occurs. When the interruption occurs during execution of the event starting cyclic task, a waiting time occurs in the task and the task may exceed the cyclic time. To avoid it, the scheduler 1, when starting the event starting cyclic task, inhibits an interruption and when the event starting cyclic task is finished, permits the interruption.

Further, the cyclic table 3 has a table indicating the cyclic time for each event shown in FIG. 4. The cyclic table 3 is a program of receiving the task ID from the scheduler 1, retrieving the cyclic time of each event corresponding to the task ID, and transmitting it to the scheduler. In this connection, the table indicates that when the task ID=0, the event is the event starting cyclic task and when the task=1, the event is a non-cyclic event task. Further, the table retains data of two tasks, though it can retain data of three or more tasks.

The timer polling unit 2 is a program of polling the timer 15 until the target time and when the target time comes, returning a task processing signal which is the starting time of the task process. The scheduler 1 calls the timer polling unit 2 before the next starting time of the task 5. The scheduler 1 gives the cycle of the event processing means 51 which is the starting cyclic task of the task 5 to the timer polling unit 2 as an argument. In this embodiment, the scheduler 1 is started by inputting the input A or B, so that an interruption of the input A or B is permitted.

Figure 5:
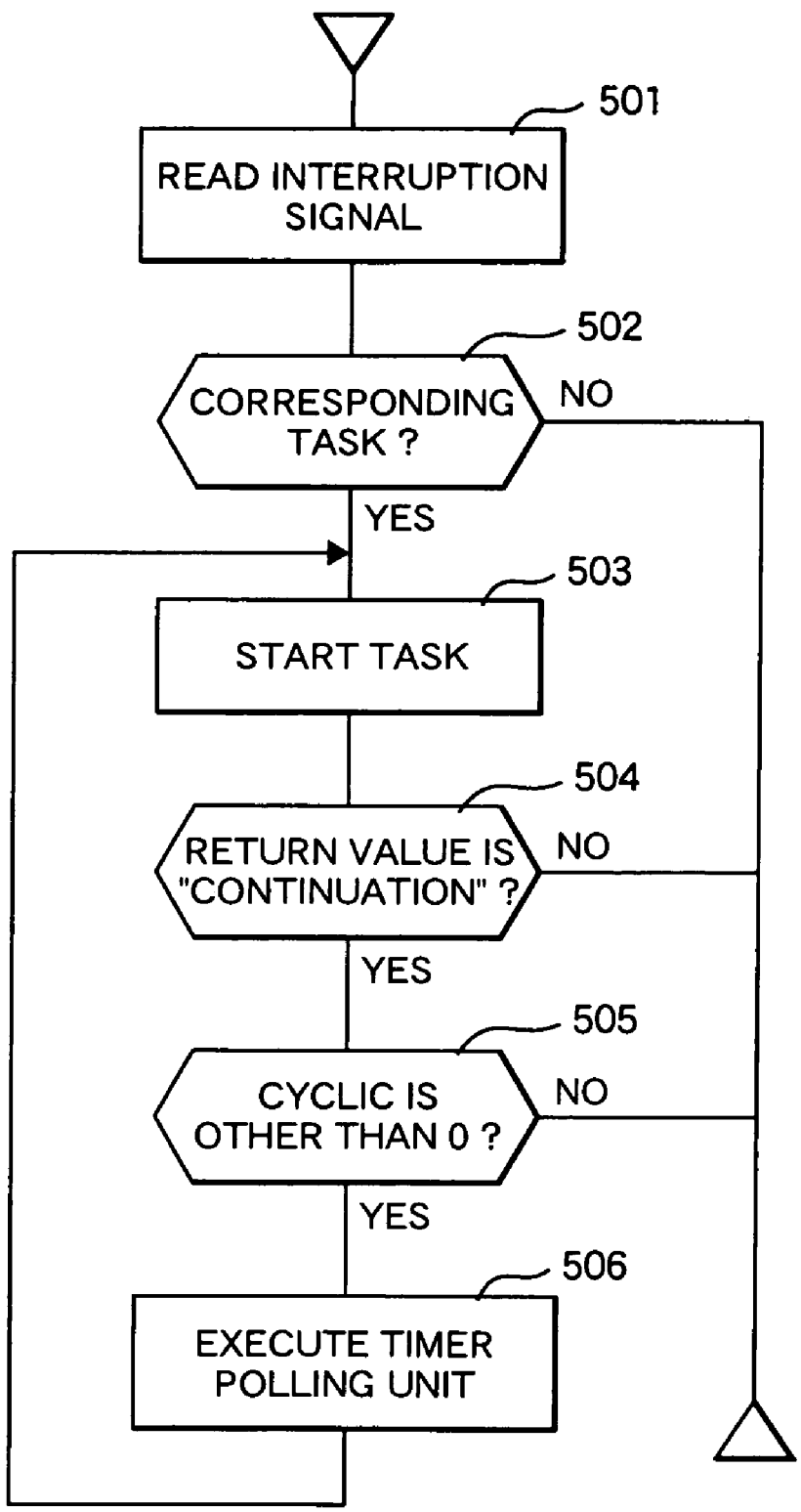
FIG. 5 is a control flow chart showing the processing contents of the scheduler relating to the first embodiment.

FIG. 5 is a control flow chart showing the processing contents of the scheduler 1 of the real-time control system relating to the first embodiment. The scheduler 1, upon receipt of an interruption from the driver unit 4, starts execution. Firstly, at Step 501, the scheduler 1 reads the interruption signal indicated before from the driver unit 4. The interruption signal is a flag for discriminating what interruption it is and here, it is a flag corresponding to "input A" or "input B".

At Step 502, using the event table shown in FIG. 3, the scheduler 1 retrieves the task 5 to be started by the interruption signal. When the task 5 to be started does not exist, the scheduler ends the process and when the task ID of the task 5 to be started exists, the scheduler 1 goes to Step 503 and starts the task 5. Namely, when the input A interrupts, the scheduler 1 gives task ID =0, when the input B interrupts, gives task ID =1, thereby starts the task 5. The starting of the task 5 is realized when the scheduler 1 jumps to the entry address of the task 5. Further, when a context switch is necessary, the scheduler 1 retains all the registers of the CPU 11 and clears the registers. When the task 5 is started at Step 503 and the process of the event processing means 51 is finished, the scheduler 1 goes to Step 504. The details of Step 503 shown here will be explained in FIG. 6 which will be described later.

At Step 504, the scheduler 1 stores either signal of "continuation" and "end" as a return value from the task deciding means 52 of the task 5. When the return value is "end", the scheduler 1 is finished and when the return value is "continuation", it goes to Step 505.

At Step 505, the scheduler 1, using the task ID indicated before, retrieves the cyclic table shown in FIG. 4 and decides whether the cycle of the task 5 is 0 or not (whether the task 5 has a cycle or not). For example, when the task ID=0 (event: input A), the cycle is 10 μsec and when the task ID=1 (event: input B), the cycle is 0 μsec. And, when the cycle is 0 (task ID=1), the scheduler 1 is finished and when the cycle is other than it (task ID=2), the scheduler 1 judges that the task 5 is an event starting cyclic task, thereby goes to Step 506.

At Step 506, the scheduler 1 executes the timer polling unit 2 and-waits for the next task starting time. To the timer polling unit 2, the scheduler 1 gives the cycle retrieved by it as an argument. The detailed execution of the timer polling unit 2 will be explained in FIG. 7 which will be described later. Thereafter, the scheduler 1, until the return value from the task 5 at Step 504 is changed to "end", executes repeatedly a series of Steps 503 to 506.

Figure 6:
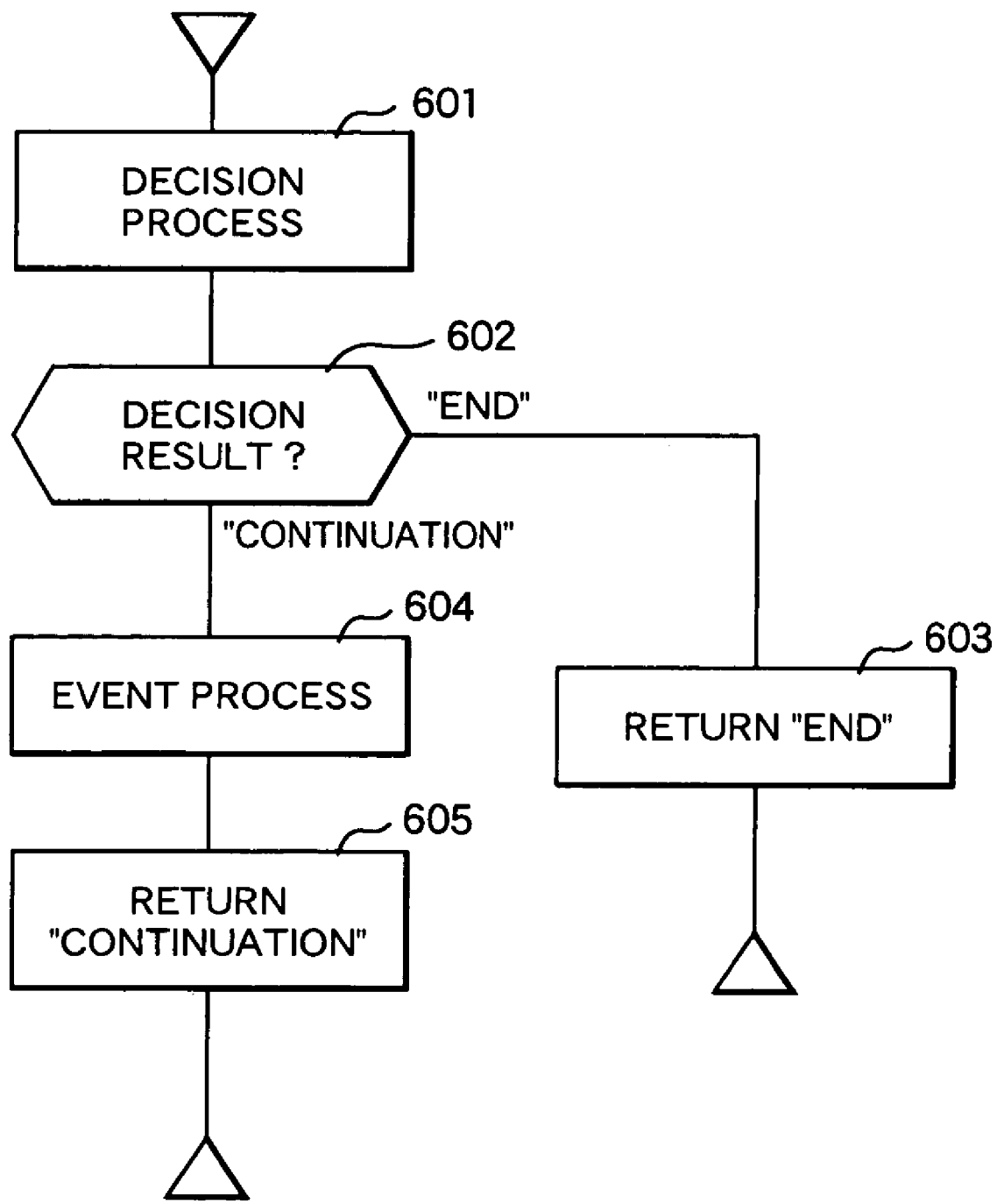
FIG. 6 is a control flow chart showing the processing contents of the task.

FIG. 6 is a control flow chart showing the task process at Step 503 shown in FIG. 5. Firstly, at Step 601, the task deciding means 52 of the task 5 performs the decision process of "continuation" or "end". For the decision process, for example, the criteria such as "whether an interruption of the input A occurs or not" and "whether the task 5 is started after an event occurs and the execution count of the event processing means 51 reaches a predetermined count or not" are provided, and the task deciding means 52 performs the decision process according to the criteria and goes to Step 602. At Step 602, the task, on the basis of the decision process of the task deciding means 52 at Step 601, judges the decision result. When the decision result is "end", the task goes to Step 603, returns "end" to the scheduler 1 as a return value, and finishes the task 5. When the decision result is "continuation", the task goes to Step 604 and performs the event process. The CPU 11 executes the event process using the event processing means 51 corresponding to the input A or B. When there is output, the output module 13 outputs a signal. Thereafter, the task goes to Step 605, returns "continuation" to the scheduler 1 as a return value, and finishes the process.

Figure 7:
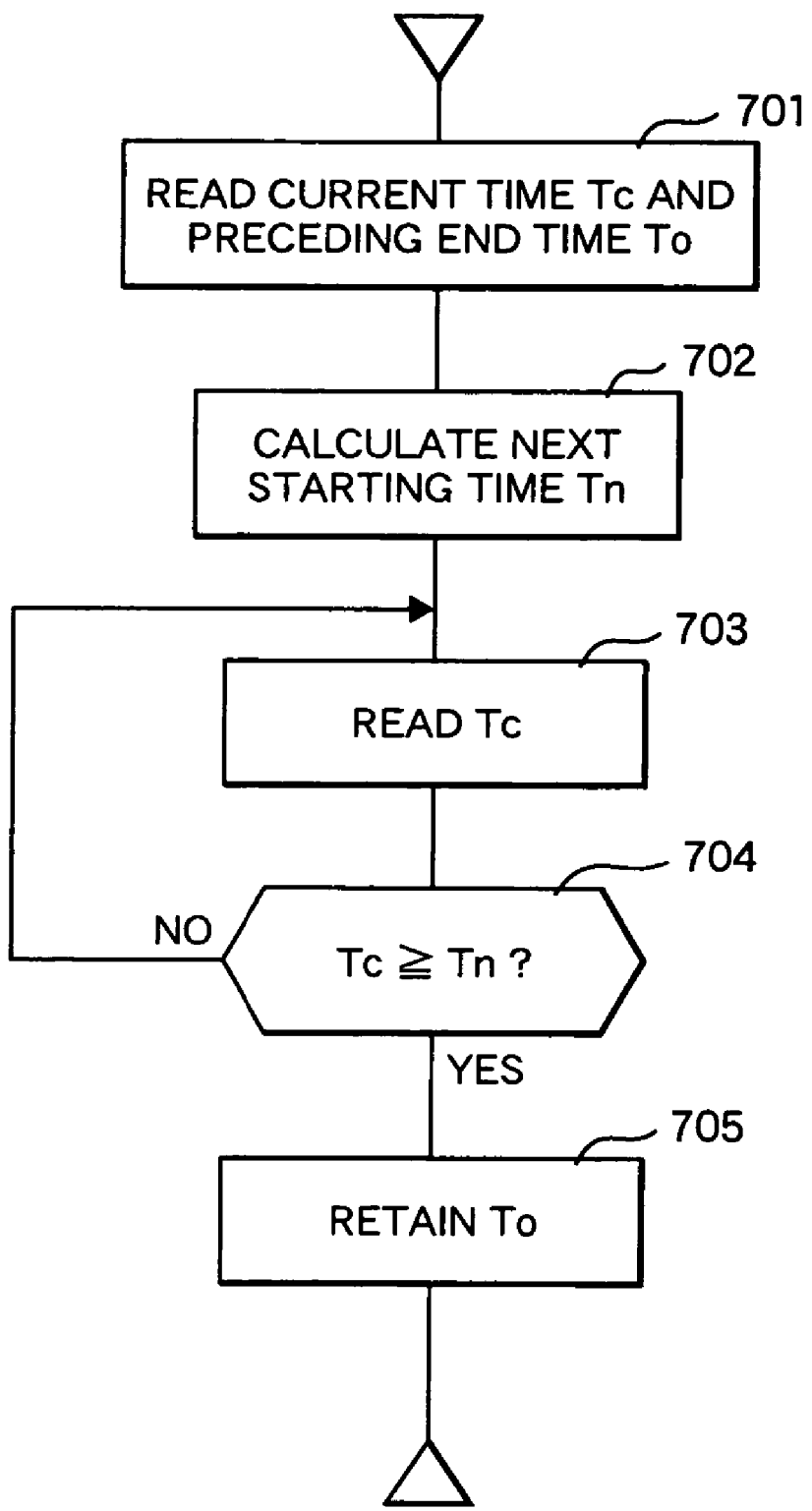
FIG. 7 is a control flow chart showing the detailed process of the timer polling unit.

FIG. 7 is a control flow chart showing the process of the timer polling unit 2. Firstly, at Step 701, the timer polling unit 2 reads the current time Tc (hereinafter referred to as Tc) and the polling end time To (hereinafter referred to as To) when the preceding polling ends. Further, To is the time when the timer polling unit 2 retains at time of the preceding execution. Immediately after an event occurs, the task executes the timer polling unit 2 first, so that at time of execution at Step 701, To becomes indefinite. Therefore, to avoid the problem, between Step 501 and Step 502 shown in FIG. 5, the scheduler 1 reads the timer 15 and records it as To of the timer polling unit 2.

Next, at Step 702, the timer polling unit 2 obtains the starting time Tn (hereinafter referred to as Tn) of the event processing means 51 of the task 5 which is scheduled to be processed next. Tn can be obtained by "To+cycle−Tc". When the timer overflows between To and Tc, that is, when Tc is smaller than To, the timer polling unit 2 compensates for the difference and decides Tn.

Thereafter, at Step 703, the timer polling unit 2 reads again Tc from the timer 15. At Step 704, the timer polling unit 2 decides whether Tc is larger than Tn or not. When an overflow of the timer 15 occurs between Tc and Tn, that is, when Tn is smaller than Tc, the timer polling unit 2 does not compare Tn with Tc before the timer 15 overflows. As a result of comparison at Step 704, until Step 704 becomes true, the timer polling unit 2 repeats Steps 703 and 704. When Step 704 becomes true, the timer polling unit 2 goes to Step 705 and retains Tc in To.

Figure 8:
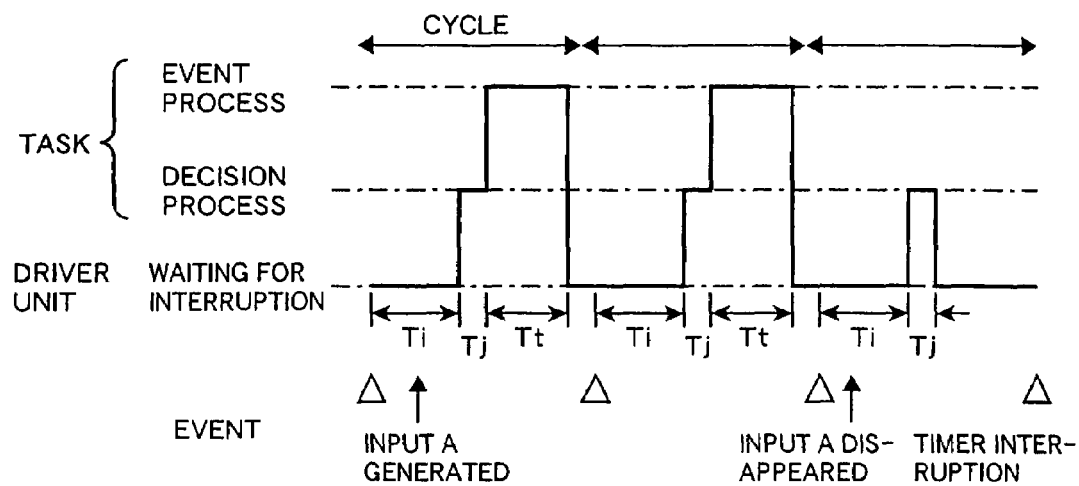
FIG. 8 is a timing chart showing the process of a conventional event cyclic task.
Figure 9:
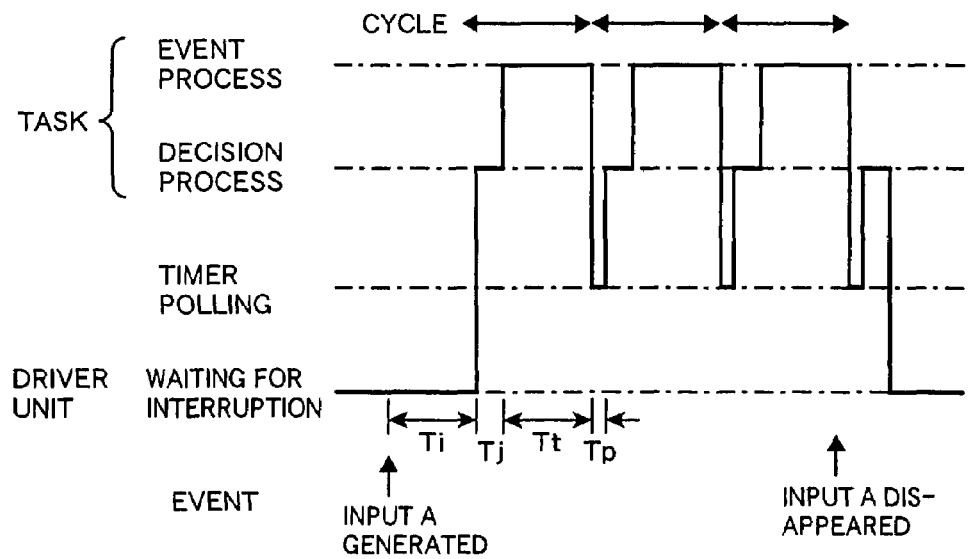
FIG. 9 is a timing chart showing the process of the event cyclic task relating to this embodiment.

FIGS. 8 and 9 are timing charts showing the process of the event cyclic task which is the event processing means 51, and FIG. 8 is a conventional timing chart, and FIG. 9 is a timing chart relating to this embodiment.

As shown in FIG. 8, in the conventional method, the cyclic task firstly decides whether an event occurs or not by polling of the input module and when an event occurs, continues the event process. After an interruption of the input A occurs, the interruption process takes an overhead time Ti (hereinafter referred to as Ti). Thereafter, during the task process, the decision process takes a process decision time Tj (hereinafter referred to as Tj) and the event process takes an event processing time Tt (hereinafter referred to as Tt). This process is repeated, so that the minimum task cycle of this method is Ti+Tj+Tt.

On the other hand, as shown in FIG. 9, in this embodiment, when the input A is inputted, the interruption handler of the drive unit is started. At that time, the interruption processing time is Ti. Thereafter, the scheduler 1 starts the task 5 and performs the decision process. As shown in FIG. 8, similarly to Tj, the decision processing time is Tj. When the decision process is "continuation", the scheduler 1 performs the event process within the event processing time Tt (hereinafter referred to as Tt). If there is plenty of time before the next cycle after end of the event process, the scheduler 1 starts the timer polling unit 2 and waits only for a polling time Tp (hereinafter referred to as Tp). Hereafter, the scheduler 1 repeats Tj, Tt, and Tp until the decision process is judged as "end". Therefore, the cycle of the task 5 becomes Tj+Tt+Tp, and the minimum value of the cycle is obtained when Tp=0, so that the cycle becomes Tj+Tt. Here, Ti is several tens μsec, while Tp is 1 μsec or shorter, so that the cycle of the task can be shortened greatly.

Figure 10:
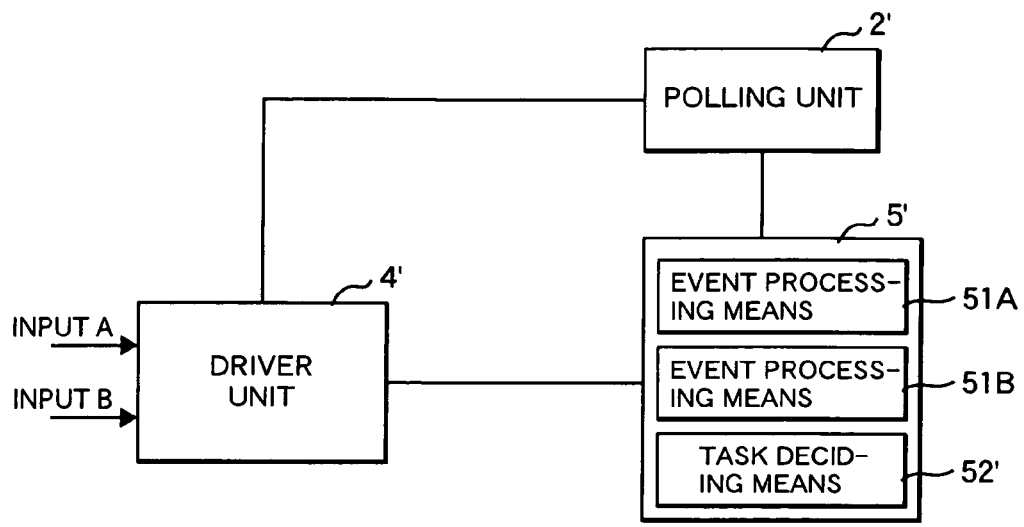
FIG. 10 is a block diagram showing the second embodiment of the real-time control system relating to the present invention.

Next, FIG. 10 is a control block diagram showing the second embodiment of the real-time control system of the present invention. The software of the real-time control system of this embodiment is composed of a driver unit 4', a polling unit 2', and a task processing means (hereinafter referred to as task) 5'. With respect to the task 5', according to the application request, two or more tasks can exist.

The driver unit 4' is a device driver for initializing and/or reading and writing the interruption handler and the register of the input module 14. The driver unit 4', immediately after resetting, initializes the registers of the input module 14 and the output module 13. When a reception interruption is required, the driver unit 4' is set so as to permit an interruption from the input module 14. In this embodiment, the task 5' is started by an interruption of the input A and input B which are input signals, so that the driver unit 4' permits beforehand an interruption of the input A and input B. The interruption handler is executed immediately after an occurrence of an interruption. The driver unit 4' performs a process of reading an input signal from the input module 14, outputting an interruption signal, and calling the task 5'. In this embodiment, there are two input of the input A and input B, though there may be three or more input.

Further, the task 5' is a program of executing the application process, and the entry address of the task 5' is stored by the driver unit 4', and the task 5' is composed of one or more functions. However, in this embodiment, the task 5' includes at least a task deciding means 52', an event processing means 51A having an input A function for processing the input A, and an event processing means 51B having an input processing function B for processing the input B.

Further, the polling unit 2' is a program of polling an interruption signal corresponding to the input A or input B of the driver unit 4' and outputting a task processing signal to the task 5'. When the execution of the event processing means 51A and the event processing means 51B of the task 5' is finished, the task 5' is not finished immediately and confirms existence of an interruption factor, so that the polling unit 2' outputs the task processing signal called from the task deciding means 52'.

Figure 11:
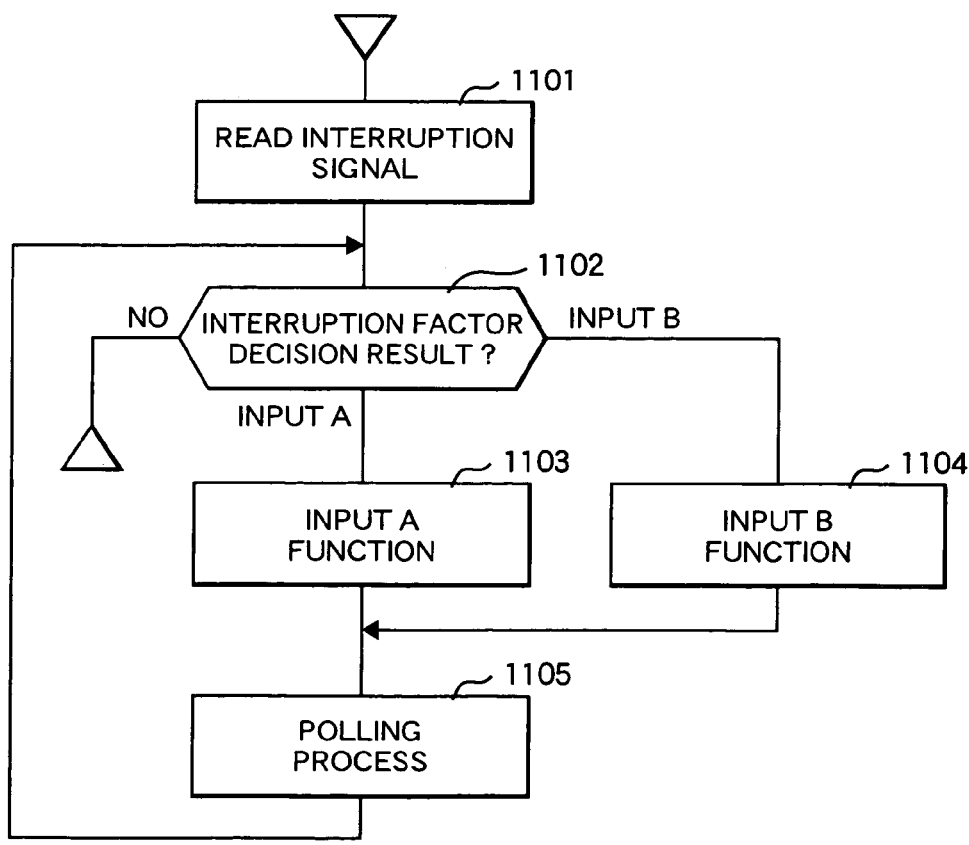
FIG. 11 is a control flow chart showing the processing contents of the task relating to the second embodiment.

FIG. 11 is a control flow chart showing the processing contents of the task 5' of the real-time control system relating to the second embodiment. Firstly, at Step 1101, the task 5', immediately after started by the driver unit 4', reads the interruption signal transferred from the driver unit 4' as an argument. And, the task 5' goes to Step 1102 and at Step 1102, decides by the task deciding means 52' whether the interruption signal, which is an interruption factor, is an interruption of the "input A" or "input B". Here, when it is "input A", the task 5' goes to Step 1103 and executes the input A function of the event processing means 51A corresponding to the input A. The input A function is a function executed when an interruption of the input A occurs. For example, when the input A is a crank signal of an engine controller unit, the event processing means 51A calculates the ignition timing. When the interruption signal is "input B" at Step 1102, the task 5' goes to Step 1104 and executes the input B function. If the interruption signal is "none" at Step 1102, the task 5' is finished. Next, at Step 1105, the task deciding means 52' calls the polling unit 2' and receives a task processing signal, if any. Thereafter, the task deciding means 52' performs again the decision at Step 1102 using the task processing signal and until the decision at Step 1102 becomes "none", repeats the series of operations indicated before.

The decision at Step 1102 is classified into two kinds depending on the selection method when there are a plurality of signals at the same time. The first is a method of selecting alternately signals. This is a method of storing the signal detected last in the memory and selecting other signals. The second is a method of selecting interruption factors in a fixed order (in the priority assigned). In the first method, the input A and input B are selected alternately, so that the signals can be processed fairly. For example, the first method is suited to a system in which no priority is assigned to the processes of the input A and input B. In the second method, the input A is always selected and only when there is no input A, the input B is selected. Or, the input process may be executed in priority. For example, the second method is suited to a system in which the priority of the process of the input A is higher than the priority of the input B. In this embodiment, the first method and second method are indicated, though the input A and input B may be selected in an order other than the aforementioned.

Furthermore, the decision at Step 1102, by a decision method when the same signal is detected again, is divided into two kinds. The first is a method of executing the event processing means 51A or the event processing means 51B corresponding to the signal detected again. The second is a method of ignoring the signal detected again and selecting an undetected signal. The advantage of the first method is that when there is continuous input, the input function can be executed several times free of the overhead time of the interruption handler.

And, this first method is suited to a case that the input A is cyclic input and the cycle thereof is very short compared with the overhead of the interruption handler. The advantage of the second method is that the method can set cyclically an interruption permitted state. In this embodiment, the task 5' operates in an interruption inhibition state to ensure the real time performance (high priority), though if the task 5' continues the operation, when an interruption other than the input A or B is caused, cannot process it. Therefore, when the second method is used, the process of the input A and input B is performed once, and then the task 5' is terminated once, thus other interruptions can be enabled.

Figure 12:
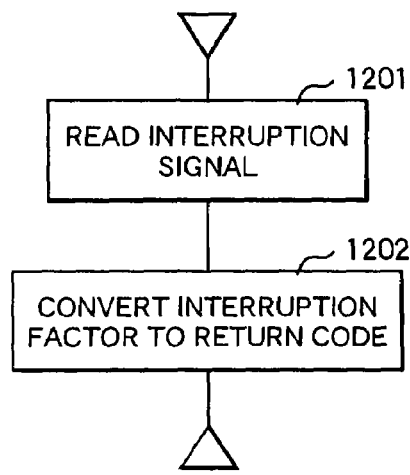
FIG. 12 is a control flow chart showing the polling contents shown in FIG. 11.

FIG. 12 is a control flow chart showing the polling contents at Step 1105 shown in FIG. 11. Firstly, at Step 1201, the polling unit reads the interruption signals from the driver unit 4'. The interruption signals are recorded in the register of either of the input module 14 and the output module 13 in a batch or dispersively. Among them, the polling unit reads a necessary interruption signal. In this embodiment, the task 5' performs the interruption process of the input A and input B, so that it reads the interruption signals of the input A and input B. And, at Step 1202, the polling unit returns the interruption signals to the task 5' as a return value. When the number of input is smaller than 32, the interruption factor for each input is replaced with a bit map, is converted to a 4-byte code, and can be returned as a return value of the function. If the number of input is 32 or larger, it is possible to generate a structure for retaining interruption factors and return the pointer thereof.

Figure 13:
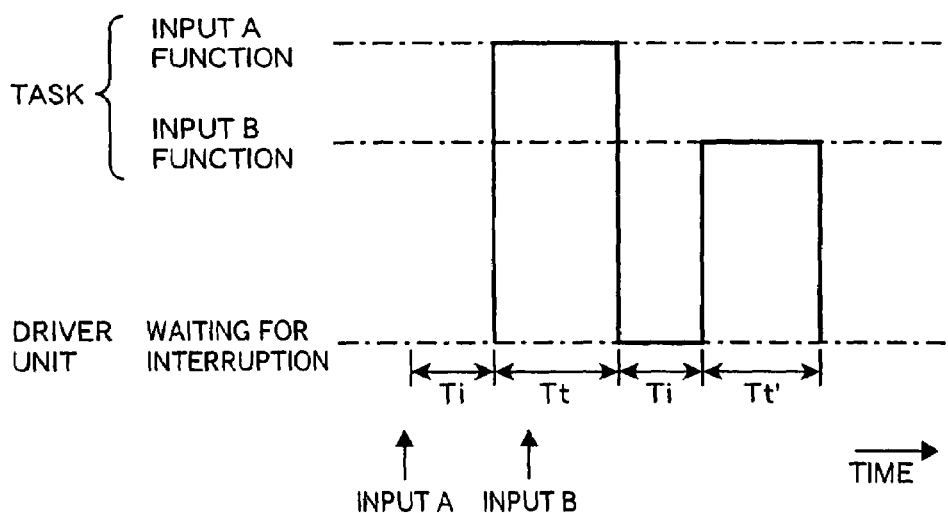
FIG. 13 is a conventional timing chart when the input B is inputted when the input A is in processing.
Figure 14:
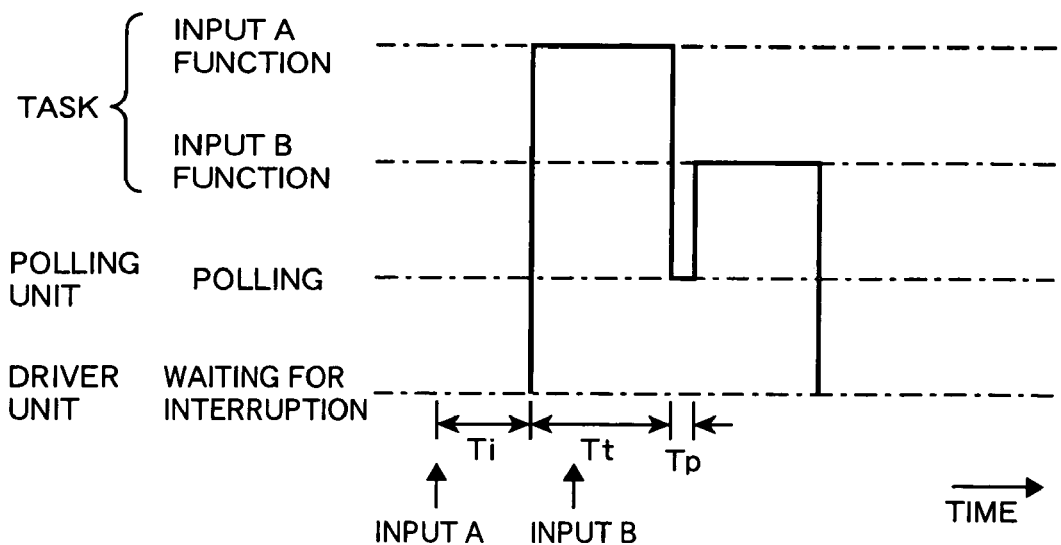
FIG. 14 is a timing chart relating to the second embodiment when the input B is inputted when the input A is in processing.
Figure 15:
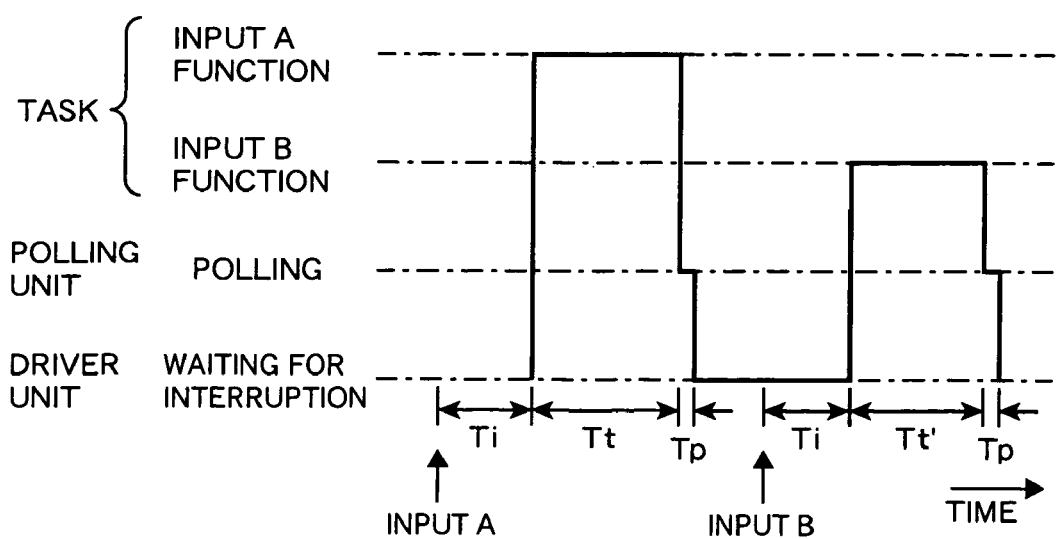
FIG. 15 is a timing chart relating to the second embodiment when the input B is inputted after the input A is processed.

FIGS. 13 to 15 are timing charts showing the processes of the event processing means 51A and the event processing means 51B, and FIG. 13 is a conventional timing chart when the input B is inputted when the input A is in processing, and FIG. 14 is a timing chart relating to this embodiment when the input B is inputted when the input A is in processing, and FIG. 15 is a timing chart relating to this embodiment when the input B is inputted after the input A is processed.

As shown in FIG. 13, conventionally, after an occurrence of an interruption of the input A, the overhead time Ti which is a time for processing the interruption handler is required. Thereafter, the event processing means 51A for processing the input A is executed for the processing time Tt. Even if an interruption of the input B occurs during the process of the event processing means 51A, since the interruption is inhibited, the process of the event processing means 51A is executed. Thereafter, when the process of the event processing means 51A is finished, the interruption inhibition is cancelled and the interruption of the input B is detected by the arithmetic unit. And, the interruption handler is called again and after the overhead time Ti, the event processing means 51B is executed.

As shown in FIG. 14, in this embodiment, when a signal of the input A is inputted firstly, as conventional, the interruption handler of the driver unit 4' performs the interruption process for the overhead time Ti. However, when an interruption of the input B occurs during the process of the event processing means 51A, the signal is stored in the polling unit 2', and after end of the function, the polling unit 2' polls for the polling time Tp, and the event processing means 51B is executed. In this case, similarly to the first embodiment, although Ti is several tens μsec, Tp is 1 μsec or less, so that the cycle of the task can be shortened greatly.

As shown in FIG. 15, when the input interval between the input A and input B is large, each input requires the polling time Tp in addition to the overhead time Ti, so that although a useless process is performed for the polling time Tp, the time is very short as mentioned above, so that the performance will not be affected adversely.

An embodiment of the present invention is described above in detail, though the present invention is not limited to the embodiment aforementioned and within a range which is not deviated from the spirit of the present invention which is described in the claims, can be variously modified in design.

For example, the driver unit, task, scheduler, and polling unit include program contents in correspondence to the functions thereof and even if these constitutions are integrated and moreover divided, the functions are kept unchanged.

Further, the first embodiment and second embodiment are explained individually, though these embodiments may be compounded to an embodiment. Particularly, as an interrupted task processing signal, an input signal and a timer signal are used, though the interrupted task processing signal is not limited to these signals.

Further, these real-time control systems can be applied to, for example, controllers of a car (controllers of the engine pre-crush sheet, sheet belt pre-tensioner, air bag, crutch, antiblock system, and electric drive valve engine) and controllers of general industrial devices and any system capable of inputting an interruption signal is not restricted particularly.

Industrial Field of Application As shown by the above description, the real-time control system of the present invention, when a cyclic event occurs or a plurality of events occur simultaneously, executes exactly the cyclic task, prevents a delay of the processing start time due to accumulation of a plurality of overhead times, thereby can execute control enabling a more detailed response and control enabling a quick and reliable response to a plurality of instructions.

What is claimed is:

1. A real-time control system comprising a driver unit for receiving an input signal and outputting an interruption signal corresponding to each task process, a polling unit for polling on the basis of said interruption signal, and a task processor for performing a task process on the basis of said interruption signal, wherein:

said polling unit outputs a task processing signal on the basis of said polling when a task is finished and said task processor performs said task process on the basis of said task processing signal, wherein said task processor is composed of event processing means for executing an event process and task deciding means for deciding continuity of said event process and said event processing means, when said decision result is continuation, continuously executes said current event process.

2. The real-time control system according to claim 1, wherein when said plurality of task processing signals are detected at the same time, said task deciding means assigns priority to each of said task processing signals and then reads them.

3. The real-time control system according to claim 1, wherein said event processing means performs said event process of starting a cycle.

4. The real-time control system according to claim 1, wherein said polling unit polls a timer and outputs said task processing signal corresponding to a start time of said task process.

5. The real-time control system according to claim 1, wherein said task deciding means, on the basis of a continuation count of a current task process or existence of an interruption signal during said current task process, decides continuity of said task process.

6. The real-time control system according to claim 1, further comprising a scheduler for communicating with said driver unit, said task processor, and said polling unit, starting in correspondence to reception of said interruption signal, and storing said decision result.

7. The real-time control system according to claim 1, wherein said polling unit polls said interruption signal generated during said event process and outputs said task processing signal for executing said event process corresponding to said interruption signal, and said task deciding means, on the basis of existence of said task processing signal, decides said continuity of said event process.

8. The real-time control system according to claim 7, wherein when said plurality of task processing signals are detected at the same time, said task deciding means assigns priority to each of said task processing signals and then reads them.

9. The real-time control system according to claim 7, wherein when said plurality of task processing signals are detected at the same time, said task deciding means, at said detection time, reads in priority signals different from said task processing signals corresponding to said event process performed by said event processing means.

10. The real-time control system according to claim 1, wherein when said plurality of task processing signals are detected at the same time, said task deciding means, at said detection time, reads in priority signals different from said task processing signals corresponding to said event process performed by said event processing means.

11. The real-time control system comprising a driver unit for receiving an input signal and outputting an interruption signal corresponding to each task process, a polling unit for polling on the basis of said interruption signal, and a task processor for performing a task process on the basis of said interruption signal, wherein:

said polling unit outputs a task processing signal on the basis of said polling when a task is finished and said task processor performs said task process on the basis of said task processing signal, wherein said task processor is composed of event processing means for executing an event process and task deciding means for deciding continuity of said event process and said event processing means, when said decision result is continuation, continuously executes said current event process, further comprising a scheduler for communicating with said driver unit, said task processor, and said polling unit. starting in correspondence to reception of said interruption signal, and storing said decision result, wherein said scheduler has a cyclic table for recording a cycle corresponding to said event processing means and said task deciding means, when said event process is completed, on the basis of a signal of said cyclic table, decides said continuity of said event process.

12. The real-time control system according to claim 11, wherein said scheduler, until it stores said decision result of end when said task deciding means is in operation, inhibits said interruption signal to interrupt said task.

* * * * *